(12) United States Patent
Chinzei

(10) Patent No.: US 8,796,172 B2
(45) Date of Patent: Aug. 5, 2014

(54) EXHAUST GAS PURIFICATION CATALYST

(75) Inventor: Isao Chinzei, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/003,537

(22) PCT Filed: Mar. 2, 2012

(86) PCT No.: PCT/IB2012/000386
§ 371 (c)(1),
(2), (4) Date: Sep. 6, 2013

(87) PCT Pub. No.: WO2012/120349
PCT Pub. Date: Sep. 13, 2012

(65) Prior Publication Data
US 2013/0345049 A1 Dec. 26, 2013

(30) Foreign Application Priority Data
Mar. 10, 2011 (JP) .................. 2011-053404

(51) Int. Cl.
| | |
|---|---|
| *B01J 20/00* | (2006.01) |
| *B01J 21/00* | (2006.01) |
| *B01J 21/04* | (2006.01) |
| *B01J 23/00* | (2006.01) |
| *B01J 23/08* | (2006.01) |
| *B01J 23/40* | (2006.01) |
| *B01J 23/42* | (2006.01) |
| *B01J 23/44* | (2006.01) |
| *B01J 23/56* | (2006.01) |

(52) U.S. Cl.
USPC .......... 502/327; 502/262; 502/304; 502/332; 502/333; 502/334; 502/339; 502/349; 502/355; 502/415; 502/439; 502/527.12; 502/527.13

(58) Field of Classification Search
USPC ......... 502/262, 304, 327, 332–334, 339, 349, 502/355, 415, 439, 527.12, 527.13
See application file for complete search history.

(56) References Cited

U.S. PATENT DOCUMENTS

| | | | |
|---|---|---|---|
| 6,335,305 B1 | 1/2002 | Suzuki et al. | |
| 6,514,905 B1* | 2/2003 | Hanaki et al. | 502/328 |
| 6,852,665 B2* | 2/2005 | Morikawa et al. | 502/302 |
| 6,864,214 B2* | 3/2005 | Uenishi et al. | 502/304 |
| 7,081,430 B2* | 7/2006 | Uenishi et al. | 502/327 |
| 7,407,911 B2* | 8/2008 | Yeo | 502/304 |
| 7,501,098 B2* | 3/2009 | Chen et al. | 422/177 |
| 7,517,510 B2* | 4/2009 | Chen et al. | 423/213.2 |

(Continued)

FOREIGN PATENT DOCUMENTS

| | | |
|---|---|---|
| EP | 1 704 910 A2 | 9/2006 |
| EP | 1 900 416 A2 | 3/2008 |

(Continued)

*Primary Examiner* — Cam N. Nguyen
(74) *Attorney, Agent, or Firm* — Finnegan, Henderson, Farabow, Garrett & Dunner, LLP

(57) ABSTRACT

An exhaust gas purification catalyst is provided with a catalyst coating layer (40) formed on the surface of a substrate (32). This catalyst coating layer (40) is formed of an upper catalyst coating layer (36) in which Rh particles are supported on a porous support, and a lower catalyst coating layer (34) in which Pd particles are supported on a support that contains an ACZ composite oxide made of alumina ($Al_2O_3$), ceria ($CeO_2$), and zirconia ($ZrO_2$).

10 Claims, 5 Drawing Sheets

(56) References Cited

U.S. PATENT DOCUMENTS

| | | | |
|---|---|---|---|
| 7,547,656 B2 * | 6/2009 | Miura | 502/327 |
| 7,550,124 B2 * | 6/2009 | Chen et al. | 423/213.2 |
| 7,638,460 B2 * | 12/2009 | Nakamura et al. | 502/326 |
| 7,749,472 B2 * | 7/2010 | Chen et al. | 423/213.2 |
| 7,758,834 B2 * | 7/2010 | Chen et al. | 423/213.2 |
| 7,759,283 B2 * | 7/2010 | Yamato et al. | 502/339 |
| 7,795,172 B2 * | 9/2010 | Foong et al. | 502/327 |
| 7,816,300 B2 * | 10/2010 | Takeuchi et al. | 502/325 |
| 7,875,250 B2 * | 1/2011 | Nunan | 422/177 |
| 7,875,573 B2 * | 1/2011 | Beutel et al. | 502/339 |
| 7,977,276 B2 * | 7/2011 | Kikuchi et al. | 502/325 |
| 8,007,750 B2 * | 8/2011 | Chen et al. | 423/239.1 |
| 8,057,924 B2 * | 11/2011 | Kaiser et al. | 428/701 |
| 8,067,330 B2 * | 11/2011 | Suzuki et al. | 502/302 |
| 8,202,819 B2 * | 6/2012 | Kohara et al. | 502/304 |
| 8,211,392 B2 * | 7/2012 | Grubert et al. | 423/213.2 |
| 8,211,824 B2 * | 7/2012 | Akamine et al. | 502/332 |
| 8,227,374 B2 * | 7/2012 | Sato et al. | 502/339 |
| 8,323,599 B2 * | 12/2012 | Nunan et al. | 423/213.2 |
| 8,337,791 B2 * | 12/2012 | Kohara et al. | 423/213.2 |
| 8,551,908 B2 * | 10/2013 | Satou et al. | 502/327 |
| 8,557,204 B2 * | 10/2013 | Nunan et al. | 423/213.5 |
| 8,568,675 B2 * | 10/2013 | Deeba et al. | 423/213.5 |

FOREIGN PATENT DOCUMENTS

| | | |
|---|---|---|
| EP | 1 985 354 A1 | 10/2008 |
| EP | 2 047 904 A1 | 4/2009 |
| JP | 10-202102 | 8/1998 |
| JP | 3379369 | 12/2002 |
| JP | 2006-297372 | 11/2006 |
| JP | 2009-648 | 1/2009 |
| JP | 2010-12397 | 1/2010 |
| JP | 2010-115591 | 5/2010 |
| JP | 2010-119994 | 6/2010 |
| JP | 2011-101839 | 5/2011 |
| WO | WO 2006/070201 A2 | 7/2006 |

* cited by examiner

EXHAUST GAS PURIFICATION CATALYST

CROSS-REFERENCE TO RELATED APPLICATIONS

This application is a national phase application of International Application No. PCT/IB2012/000386, filed Mar. 2, 2012, and claims the priority of Japanese Application No. 2011-053404, filed Mar. 10, 2011, the content of both of which is incorporated herein by reference.

BACKGROUND OF THE INVENTION

1. Field of the Invention

The invention relates to an exhaust gas purification catalyst, and more particularly relates to a ceramic support that is a constituent of this catalyst.

2. Description of Related Art

Three-way catalysts are widely used as catalysts for the purification of the hydrocarbon (HC), carbon monoxide (CO), and nitrogen oxides (NOx) present in the exhaust gas emitted from engines in, e.g., automobiles and so forth. In a typical three-way catalyst structure, for example, an alumina coating layer is formed on the surface of a highly heat-resistant ceramic substrate and platinum (Pt), palladium (Pd), and rhodium (Rh), which are noble metal catalysts, are supported on this coating layer.

In order to efficiently purify the aforementioned exhaust gas components using such a three-way catalyst, i.e., in order to convert them into $H_2O$, $CO_2$, and $N_2$ by oxidation or reduction, the air-fuel ratio, i.e., the mixing ratio between the air and gasoline supplied to the engine, must be near the stoichiometric air-fuel ratio (stoichiometry). With the goal of increasing the width of the catalyst purification window, i.e., the range of the air-fuel ratio in which the catalyst can effectively function, an oxygen storage material having an oxygen storage capacity (OSC), and typified by cerium oxide ($CeO_2$), is also generally widely used in the exhaust gas purification catalyst. The oxygen storage material present in an exhaust gas purification catalyst works as follows: when the air-fuel ratio in the exhaust gas is lean (that is, an atmosphere on the excess oxygen side), it stores the oxygen in the exhaust gas, and when the air-fuel ratio in the exhaust gas is rich (that is, an atmosphere on the excess fuel side), it releases the stored oxygen. This provides a stable catalyst performance even when the oxygen concentration in the exhaust gas varies and thereby improves the purification performance of the catalyst. In an example of a typical catalyst structure that employs an oxygen storage material, a composition in which alumina and the oxygen storage material are mixed in prescribed proportions is coated on the surface of the substrate and noble metal catalyst (Pt, Pd, Rh, and so forth) is supported thereon.

In order to obtain additional improvements in the purification performance, exhaust gas purification catalysts have been proposed in the last few years in which the catalyst coating layer is executed as a two layer structure and Rh is supported separately from the Pt or Pd. Here, the entire noble metal catalyst is not supported in a single support layer; rather, the catalyst coating layer is formed as a layer structure that has at least two layers, i.e., an upper layer and a lower layer, and Pt or Pd is supported in one layer and Rh is separately supported in another layer. This has the effect of inhibiting the decline in catalytic activity caused by Rh alloying with the Pt or Pd. For example, Japanese Patent Application Publication Nos. 2009-648 (JP 2009-648 A), 2010-115591 (JP 2010-115591 A), and 2010-119994 (JP 2010-119994 A) describe exhaust gas purification catalysts that have a two layer structure formed of a lower layer and an upper layer, wherein Pd or Pt is supported in the lower layer on a support that contains a Ce—Zr composite oxide (also referred to as "CZ composite oxide" below), which is an oxygen storage material, and Rh is supported in the upper layer on a support that contains, for example, CZ composite oxide.

On the other hand, as noted above, a mixture of cerium oxide (typically $CeO_2$), which has an OSC, and alumina ($Al_2O_3$) is in wide use as a noble metal catalyst support. However, cerium oxide has a lower heat resistance than alumina, and when used at high temperatures, the crystalline structure changes and/or crystal growth advances, resulting in a decline in the specific surface area. As a result, when a three-way catalyst that contains a noble metal catalyst and cerium oxide is used in the high temperature region of 800° C. and above, the OSC of the catalyst will be substantially reduced after this. This is accompanied by a decline in the low-temperature purification performance of the catalyst post-durability testing.

As a consequence, with the goal of inhibiting crystal growth by the cerium oxide, CZ composite oxides or solid solutions provided by the addition of zirconium oxide in addition to cerium oxide are in wide use as oxygen storage materials (for example, JP 2009-648 A). However, the low-temperature catalytic activity of the catalyst post-durability testing has still not been satisfactory even using a CZ composite oxide.

Japanese Patent Application Publication No. 10-202102 (JP 10-202102 A) thus discloses for the first time a technology that uses an oxygen storage material in the form of an aluminum (Al)-cerium (Ce)-zirconium (Zr) composite oxide produced from metal alkoxide. According to JP 10-202102 A, this Al—Ce—Zr composite oxide is formed of small primary particles provided by mixing Ce and Zr with Al to uniformity at an atomic or molecular level, and a catalyst having Pt and Rh supported on a support that contains the Al—Ce—Zr composite oxide exhibits a greater inhibition of the OSC drop post-durability testing than a catalyst having Pt and Rh supported on a support in with alumina is simply mixed with a CZ composite oxide.

Additional improvements in purification performance are desired for these exhaust gas purification catalysts. In particular, after durability testing by exposure to high-temperature exhaust gas, these catalysts exhibit a substantial drop in catalytic activity from their initial level. For a cerium oxide-containing support loaded with a noble metal catalyst, one cause of this substantial drop in catalytic activity is believed to be that the OSC of the catalyst after use in high-temperature durability testing exhibits a substantial decline from the OSC in initial use. As noted above, one reason for the drop in the OSC after durability testing is the advance in crystal growth by cerium oxide in high temperature regions.

Moreover, accompanying the strengthening of fuel economy requirements in recent years, the exhaust gas temperatures of not only diesel engines but also gasoline engines are trending downward. For example, the gasoline engine in a hybrid vehicle experiences very frequent operation under low temperature conditions. Accordingly, it has become critical that the catalytic activity also not be reduced at low temperatures. However, the previously described exhaust gas purification catalysts have not had a satisfactory low-temperature activity post-durability testing.

SUMMARY OF THE INVENTION

The invention provides an exhaust gas purification catalyst that exhibits an excellent purification performance and that can maintain its purification performance even when exposed to high-temperature exhaust gas.

The exhaust gas purification catalyst according to an aspect of the invention is provided with a substrate, a catalyst coating layer that is formed of a porous support and is formed on the surface of the substrate, and a noble metal catalyst that is supported on the porous support of the catalyst coating layer. This catalyst coating layer is formed as a layer structure having an upper layer relatively farther from the substrate surface and a lower layer relatively closer to the substrate surface. In addition, Rh particles are supported as the aforementioned noble metal catalyst in the upper layer and Pd particles are supported as the aforementioned noble metal catalyst in the lower layer. In the exhaust gas purification catalyst disclosed herein, the porous support of the lower layer that supports the aforementioned Pd particles is formed by a composite oxide made of alumina ($Al_2O_3$), ceria ($CeO_2$), and zirconia ($ZrO_2$) (this composite oxide is also referred to below as an "ACZ composite oxide").

In the exhaust gas purification catalyst with the described structure, the porous support of the lower layer (also referred to below as the "Pd catalyst layer") of the layer-structured catalyst coating layer is formed of the aforementioned ACZ composite oxide (this porous support is also referred to below as the "ACZ support"). This results in an inhibition of crystal growth (sintering) in the catalyst support (here, the support for the Pd) during exposure to high-temperature exhaust gas and at the same time can prevent the OSC from declining. Accordingly, an exhaust gas purification catalyst with the described structure can provide an improved durability (particularly the heat resistance) and can maintain a stable catalytic activity. In addition, the catalytic activity in a relatively low temperature region (for example, 300 to 600° C.), i.e., the low-temperature activity, can be improved by the disposition of the ACZ support.

A Ce/Zr atomic ratio in the ACZ composite oxide in the lower layer may not be more than 0.6 in the exhaust gas purification catalyst according to the above-described aspect.

The Ce/Zr atomic ratio in the ACZ composite oxide may be from at least 0.15 to not more than 0.55 in the exhaust gas purification catalyst according to the above-described aspect.

The durability (heat resistance) of the ACZ support can be increased even further by having this Ce/Zr atomic ratio be not more than 0.6 (for example, from at least 0.1 to not more than 0.6 and more preferably from at least 0.15 to not more than 0.55). A high durability can be present in combination with a high OSC value when this Ce/Zr atomic ratio is about 0.4 to 0.55 (for example, from at least 0.4 to not more than 0.55), and such a Ce/Zr atomic ratio is therefore particularly preferred.

An alumina ($Al_2O_3$) component content in the ACZ composite oxide in the exhaust gas purification catalyst according to the above-described aspect may be from 40 to 70 mass %. An even better realization of an improved heat resistance and a high OSC value for the ACZ support and a high low-temperature activity can be achieved by bringing the alumina component content into this range.

Primary particles in the ACZ composite oxide may have an average particle diameter of not more than 10 nm and a specific surface area of at least 30 $m^2/g$ in the exhaust gas purification catalyst according to the above-described aspect.

The porous support in the lower layer in the exhaust gas purification catalyst according to the above-described aspect may further contain, in addition to the aforementioned ACZ composite oxide, at least one rare earth oxide selected from $La_2O_3$, $Y_2O_3$, and $Pr_6O_{11}$.

The porous support (also referred to below as the "$Al_2O_3$—CZ support") of the upper layer (also referred to below as the "Rh catalyst layer") that supports the aforementioned Rh particles, in the exhaust gas purification catalyst according to the above-described aspect, is formed by a mixture (also referred to below as the "$Al_2O_3$—CZ mixture") of alumina and a CZ composite oxide made of ceria and zirconia. A high catalytic activity on the part of the Rh catalyst layer can be brought about by disposing this upper layer (the Rh catalyst layer) in combination with the previously described Pd catalyst layer.

A Ce/Zr atomic ratio in the CZ composite oxide in the aforementioned upper layer may be at least 0.5 in the exhaust gas purification catalyst according to the above-described aspect.

The Ce/Zr atomic ratio in the CZ composite oxide in the aforementioned upper layer may be from at least 0.7 to not more than 0.8 in the exhaust gas purification catalyst according to the above-described aspect.

A high OSC can be realized for the Rh catalyst layer by having the Ce/Zr atomic ratio in the CZ composite oxide in the aforementioned $Al_2O_3$—CZ support be at least 0.5 (for example, from at least 0.5 to not more than 0.8 and particularly at least 0.7, for example, from at least 0.7 to not more than 0.8).

The porous support in the aforementioned upper layer in the exhaust gas purification catalyst according to the above-described aspect may further contain at least one rare earth oxide selected from $La_2O_3$, $Y_2O_3$, and $Pr_6O_{11}$.

The ACZ composite oxide in the exhaust gas purification catalyst according to the above-described aspect may be produced by an alkoxide method, and heat treatment in the alkoxide method is preferably performed at from at least 500° C. to not more than 900° C.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention are described below based on the figures. The exhaust gas purification catalyst of the invention is not limited to the embodiments that follow and can be realized—within a range that does not depart from the essential features of the invention—in various forms as provided by the execution of modifications, improvements, and so forth that can be carried out by the individual skilled in the art. As already described above, the exhaust gas purification catalyst disclosed here contains a substrate, a catalyst coating layer that is formed of a porous support and is formed on the surface of the substrate, and a noble metal catalyst that is supported on the porous support of the catalyst coating layer. In addition, the catalyst coating layer is formed as a layer structure.

Figure 1:
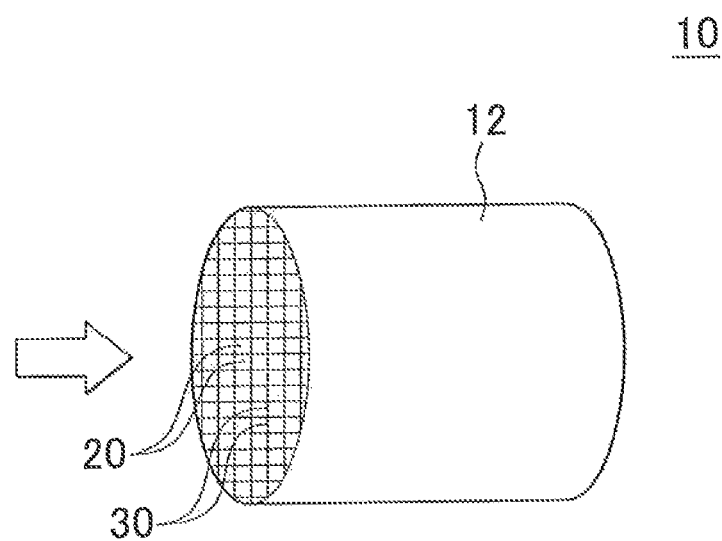
FIG. 1 is a schematic illustration of an exhaust gas purification catalyst according to an embodiment of the invention.
Figure 2:
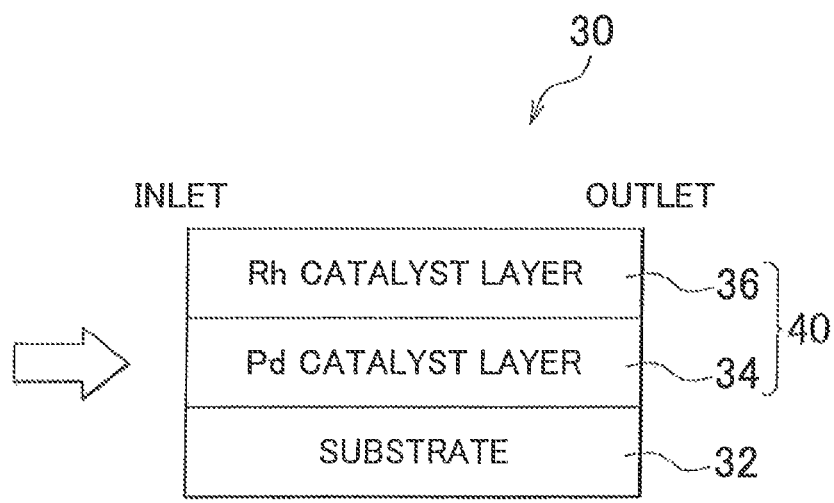
FIG. 2 is an explanatory drawing that schematically shows the structure of the rib wall element in the exhaust gas purification catalyst of FIG. 1.

The various materials and configurations generally used in applications of this type can be used for the substrate that is a constituent of the herein disclosed exhaust gas purification catalyst. For example, a honeycomb substrate provided with a honeycomb structure formed from an alloy (e.g., stainless steel) or a ceramic such as cordierite or silicon carbide (SiC) can be suitably used. An example is a honeycomb substrate having a cylindrical outer shape and provided with through-penetrating holes (cells) that form exhaust gas passages along the axis of the cylinder, wherein the exhaust gas can come into contact with the partition walls (rib walls) that define the individual cells. In addition to a honeycomb shape, the substrate can have, for example, a foam configuration or a pellet configuration. Instead of a cylindrical shape, for example, an elliptical cylinder or a polyhedron may be used for the outer shape of the substrate as a whole. FIG. 1 is a schematic diagram of a typical example of an exhaust gas purification catalyst. Here, the exhaust gas purification catalyst 10 of this embodiment is provided with a honeycomb substrate 12 that has a plurality of regularly arranged cells 20 and rib walls 30 that form the cells 20. FIG. 2 is an explanatory drawing that schematically illustrates the structure of the surface region of the rib wall 30 in the honeycomb substrate 12 of FIG. 1. Thus, the rib wall 30 is provided with a substrate 32 and a catalyst coating layer 40 having a bilayer structure and formed on the surface of the substrate 32. More particularly, this bilayer-structured catalyst coating layer 40 is formed of a lower layer 34 (also referred to below as the "lower catalyst coating layer 34" or the "Pd catalyst layer 34") that is closer to the substrate 32 and supports Pd as the noble metal catalyst, and an upper layer 36 (also referred to below as the "upper catalyst coating layer 36" or the "Rh catalyst layer 36") that is farther from the substrate 32 and supports Rh as the noble metal catalyst. The layer structure of the catalyst coating layer 40 that is a constituent of the herein disclosed exhaust gas purification catalyst 10 is obtained by first forming the lower catalyst coating layer 34 on the surface of the substrate 32 and then forming the upper catalyst coating layer 36 on the surface of the lower catalyst coating layer 34.

The previously described ACZ composite oxide is present in the support in the lower layer (Pd catalyst layer) 34 that is a constituent of the herein disclosed exhaust gas purification catalyst 10. This ACZ composite oxide can be produced, for example, by an alkoxide method or a coprecipitation method. As the starting materials in an alkoxide method, Al, Ce, and Zr are all converted into the metal alkoxide, or at least one of Al, Ce, and Zr is converted into the metal alkoxide, while a metal salt, e.g., the nitrate salt, is used for components other than the metal alkoxide(s). These are dissolved in a suitable solvent and mixed and hydrolysis and polycondensation reactions are carried out, after which the ACZ composite oxide is obtained by a heat treatment. In a coprecipitation method, hydroxide precursors are coprecipitated by adding a base to a mixed aqueous solution of a water-soluble aluminum salt, a water-soluble cerium salt, and a water-soluble zirconium salt and the ACZ composite oxide is obtained by baking this coprecipitate. ACZ composite oxide produced by an alkoxide method is preferred because the Al, Ce, and Zr become almost uniformly mixed at the atomic or molecular (oxide) level and such an ACZ composite oxide exhibits a high heat resistance and a high OSC.

The Ce/Zr atomic ratio in the ACZ composite oxide used in the support in the lower layer 34 is suitably approximately 1±0.1 or less, while not more than 0.6, for example, from at least 0.1 to not more than 0.6 (more preferably from at least 0.15 to not more than 0.55) is preferred. A high catalytic activity and a high OSC can be realized for the Pd catalyst layer 34 by having Ce/Zr be in this range.

The heat treatment in the process of producing the ACZ composite oxide by an alkoxide method is preferably carried out at from at least 500° C. to not more than 900° C. Running the heat treatment at this temperature makes it possible to achieve an even better inhibition of the OSC drop after durability testing. When the heat treatment temperature is less than 500° C., there is little inhibition of the crystal growth-induced reduction in the OSC post-durability testing and an extended period of time is also required for the heat treatment. When the heat treatment temperature exceeds 900° C., growth by the ACZ ends up occurring and the OSC is reduced. The herein disclosed ACZ composite oxide preferably has a very small primary particle diameter; for example, an ACZ composite oxide powder is desirably used that has an average primary particle diameter (here and below this is the average value based on scanning electron microscope (SEM) or transmission electron microscope (TEM) observation) of not more than 10 nm and a Brunauer-Emmett-Teller (BET) specific surface area (the specific surface area measured based on BET theory) of at least 30 $m^2/g$. When the primary particle diameter (average particle diameter) is too larger than 10 nm and the BET specific surface area is too smaller than 30 $m^2/g$, the OSC of the resulting ACZ support is quite prone to decline and the catalytic activity is then reduced, making such values undesirable.

In addition to the ACZ composite oxide, the support in the lower layer (Pd catalyst layer) 34 may contain a rare earth oxide such as $La_2O_3$, $Y_2O_3$, or $Pr_6O_{11}$. The thermal stability of the ACZ composite oxide is further enhanced by the presence of these rare earth oxides. For example, a strong inhibition of sintering is obtained. The rare earth oxide may be physically mixed in the form of the simple oxide into the support powder or may be made a component of the composite oxide. In these cases, the amount of addition of the rare earth oxide with reference to the mass of the support as a whole is preferably from at least 2 mass % to not more than 6 mass %. There is little inhibiting effect on sintering when the amount of rare earth oxide addition is smaller than 2 mass %. At above 6 mass %, the compositional proportion for the ACZ composite oxide undergoes a relative decline and the heat resistance and OSC of the support decline as a consequence. There are no particular limitations on the amount of Pd supported on the porous support in the lower layer 34, but a suitable range is 0.05 to 2 mass % (for example, 0.5 to 1 mass %) with reference to the total mass of the support in the lower layer 34. A satisfactory catalytic activity is hot obtained at less than this. The effect is saturated when more than this is supported, which is thus disadvantageous from a cost perspective. In order to form the lower catalyst coating layer 34, the surface of the substrate 32 may be washcoated with a slurry containing the ACZ composite oxide powder and the Pd may be supported thereon, or the surface of the substrate 32 may be washcoated with a slurry that contains a catalyst powder provided by preliminarily supporting Pd on the ACZ composite oxide powder.

The porous support in the upper layer (Rh catalyst layer) 36 that is a constituent of the herein disclosed exhaust gas purification catalyst 10 can contain the substances generally used for supports of this type, e.g., alumina ($Al_2O_3$), ceria ($CeO_2$), zirconia ($ZrO_2$), and their solid solutions and composite oxides. A high heat resistance and a high catalytic activity are exhibited when a mixture of alumina and CZ composite oxide ($Al_2O_3$—CZ mixture) is used, and the use of such a mixture is thus preferred.

The Ce/Zr atomic ratio in the CZ composite oxide used in the support in the upper layer 36 is suitably approximately 1±0.1 or less, while at least 0.5 (for example, from at least 0.5 to not more than 0.8 and particularly at least 0.7, for example, from at least 0.7 to not more than 0.8) is preferred. A high catalytic activity and a high OSC can be realized for the Rh catalyst layer 36 by having Ce/Zr be in this range.

With the objective of inhibiting sintering, a rare earth oxide such as $La_2O_3$, $Y_2O_3$, or $Pr_6O_{11}$ may be admixed into the support of the upper layer 36. This rare earth oxide may be physically mixed in the form of the simple oxide into the support powder or may be made a component of the composite oxide. The amount of addition of the rare earth oxide is preferably from at least 2 mass % to not more than 6 mass % with reference to the mass of the support as a whole. There is little inhibiting effect on sintering when the amount of rare earth oxide addition is smaller than 2 mass %. At above 6 mass %, the amount of $Al_2O_3$ and $CeO_2$ in the support undergoes a relative decline and the heat resistance and OSC decline as a consequence. There are no particular limitations on the amount of Rh supported on the porous support in the upper layer 36, but a suitable range is 0.01 to 1 mass % (for example, 0.05 to 0.5 mass %) with reference to the total mass of the support in the upper layer 36. A satisfactory catalytic activity is not obtained at less than this. The effect is saturated when more than this is supported, which is thus disadvantageous from a cost perspective. In order to form the upper catalyst coating layer 36, the surface of the lower catalyst coating layer 34 may be washcoated with a slurry containing the support powder and the Rh may be supported thereon, or the surface of the lower catalyst coating layer 34 may be washcoated with a slurry that contains a catalyst powder provided by preliminarily supporting Rh on the support powder.

The slurry in the process of forming the catalyst coating layer 40 by washcoating preferably contains a binder in order to bring about a suitable adhesion by the slurry to the surface of the substrate 32 or the surface of the support of the lower layer 34. This slurry is preferably, for example, an alumina sol or a silica sol. The viscosity of the slurry should be a viscosity that enables the slurry to easily flow into the cells 20 of the substrate (for example, the honeycomb substrate 12). In order to raise the thermal stability of the support, La-stabilized $Al_2O_3$ can be added to the slurry. When this is done, the quantity of La-stabilized $Al_2O_3$ addition is preferably 15 to 50 g per 1 L of volume of the slurry. The improvement in the thermal stability due to the addition of La is inadequate when the quantity of La-stabilized $Al_2O_3$ addition is less than 15 g per 1 L of slurry. At more than 50 g, the mixing proportions of the other component, e.g., the ACZ composite oxide or CZ composite oxide, is relatively reduced and the OSC is reduced as a result.

The drying conditions for the slurry washcoated on the surface of the substrate 32 will depend on the shape and dimensions of the substrate or support, but are typically about 1 to 10 hours at about 80 to 120° C. (for example, 100 to 110° C.). The baking conditions are about 2 to 4 hours at about 400 to 1,000° C. (for example, 500 to 700° C.). There are no particular limitations on the casting amount for the catalyst coating layer 40, and, for example, the total quantity of the lower catalyst coating layer 34 and the upper catalyst coating layer 36 is preferably from about 5 to 500 g per 1 L of volume of the honeycomb substrate 12. When the amount of the catalyst coating layer 40 per 1 L of volume of the honeycomb substrate 12 is less than 5 g, the function as a catalyst coating layer is only weakly manifested and grain growth of the supported noble metal particles can occur. More than 500 g for the amount of the catalyst coating layer 40 causes an increase in the pressure loss when the exhaust gas passes through the cells 20 in the honeycomb 12. It is sufficient for the layer structure of the catalyst coating layer 40 to have the previously described Rh catalyst layer for the upper layer 36 and the previously described Pd catalyst layer for the lower layer 34, but this layer structure may also be three or more layers in which at least another layer (for example, a separate layer adjacent to the substrate) is present in addition to the two layers indicated above.

Several examples relating to the invention are described below, but there is no intent to limit the invention to what is shown in these specific examples.

PRODUCTION EXAMPLES

Examples 1 to 6

An ACZ composite oxide powder was first produced for use as the support for the lower catalyst coating layer (Pd catalyst layer) 34. To obtain the ACZ composite oxide, cerium (III) nitrate hexahydrate ($Ce(NO_3)_3.6H_2O$), zirconium oxynitrate dihydrate ($ZrO(NO_3)_2.2H_2O$), and aluminum isopropoxide ($Al[OCH(CH_3)_2]_3$) were used as starting materials and were dissolved in water or an alcohol solvent and mixed and stirred for 48 hours at 80° C. The resulting precipitate was washed with water, dried, and baked for 2 hours at 500° C. to yield an ACZ composite oxide powder. The obtained ACZ composite oxide powder had an average primary particle diameter of 4 to 5 nm based on TEM observation and had a BET specific surface area of 180 $m^2/g$.

A total of six ACZ composite oxides having different component proportions for the Al, Ce, and Zr were produced by the above-described production process (Examples 1 to 6). The component proportions for each of the Al, Ce, and Zr are shown in Table 1. Assigning 100 mass % to the obtained ACZ composite oxide, the individual component proportions in Table 1 have been converted into the $Al_2O_3$ content (mass %), the $CeO_2$ content (mass %), the $ZrO_2$ content (mass %), and the content (mass %) of any rare earth oxide added as an additive. The cerium-to-zirconium atomic ratios (Ce/Zr) in the ACZ composite oxides in these cases were 0.19 (Example 1), 0.52 (Example 2), 0.74 (Example 3), 1.03 (Example 4), 0.89 (Example 5), and 0.97 (Example 6).

TABLE 1

| | lower layer support | proportions of the individual components in the lower layer support (mass %) | | | | | | Ce/Zr (atomic ratio) |
|---|---|---|---|---|---|---|---|---|
| | | $Al_2O_3$ | $CeO_2$ | $ZrO_2$ | $La_2O_3$ | $Y_2O_3$ | $Pr_6O_{11}$ | |
| Example 1 | ACZ | 50.47 | 10.09 | 35.38 | 2.03 | 2.03 | 0 | 0.19 |
| Example 2 | ACZ | 50.69 | 19.97 | 25.50 | 1.92 | 1.92 | 0 | 0.52 |
| Example 3 | ACZ | 44.00 | 28.00 | 25.00 | 0 | 0 | 3.00 | 0.74 |
| Example 4 | ACZ | 49.79 | 28.27 | 17.99 | 2.01 | 1.94 | 0 | 1.03 |
| Example 5 | ACZ | 33.70 | 35.20 | 26.10 | 1.70 | 1.90 | 0 | 0.89 |
| Example 6 | ACZ | 66.50 | 16.50 | 11.20 | 2.90 | 1.20 | 0 | 0.97 |
| Comparative Example 1 | AZ | 50.65 | 0 | 45.31 | 2.04 | 2.00 | 0 | 0 |
| Comparative Example 2 | CZ | 0 | 30 | 60 | 5 | 5 | 0 | 0.3 |
| Comparative Example 3 | $Al_2O_3$ + CZ | 50 | 15 | 30 | 2.5 | 2.5 | 0 | 0.3 |

Pd was then supported on the ACZ composite oxide powder using a palladium nitrate (Pd(NO$_3$)$_2$) solution, followed by baking for 3 hours at 300° C. in the atmosphere to obtain the Pd-loaded ACZ composite oxide powder. The supported Pd was 0.58 mass % letting the obtained Pd-loaded ACZ composite oxide powder be 100 mass %. A lower layer slurry was prepared by mixing La-stabilized Al$_2$O$_3$ powder, Al$_2$O$_3$ binder, and distilled water into the obtained Pd-loaded ACZ composite oxide powder. The mass per unit volume of the individual components in this slurry is given in Table 2.

TABLE 2

| | upper layer (g/L) | lower layer (g/L) |
|---|---|---|
| support powder | 60 | 120 |
| La-stabilized Al$_2$O$_3$ | 25 | 40 |
| Al$_2$O$_3$ binder | 5 | 13 |
| noble metal catalyst | Rh/0.1 | Pd/0.7 |

A CZ composite oxide was then prepared by a coprecipitation method for use as the support for the upper catalyst coating layer (Rh catalyst layer) 36. Thus, cerium nitrate hexahydrate (Ce(NO$_3$)$_3$.6H$_2$O) and zirconium oxynitrate dihydrate (ZrO(NO$_3$)$_2$.2H$_2$O) were used as starting materials and were dissolved in distilled water to prepare an aqueous solution, which was then mixed. A hydroxide precipitate was obtained by the addition of this solution while stirring to an aqueous NH$_4$OH solution that contained NH$_3$ at 1.2 times the neutralization equivalent. The obtained precipitate was separated by centrifugation and the supernatant was removed. This was followed by washing with pure water 3 times and carrying out a heat treatment at 800° C. for 5 hours to obtain a CZ composite oxide.

The obtained CZ composite oxide was mixed with a prescribed amount of Al$_2$O$_3$ using a mortar to obtain a CZ composite oxide+Al$_2$O$_3$ mixture (the Al$_2$O$_3$—CZ mixture) for use as the upper layer support. Letting the Al$_2$O$_3$—CZ mixture be 100 mass %, the proportions of the Al, Ce, and Zr in the Al$_2$O$_3$—CZ mixture had been brought to 44 mass % for the Al$_2$O$_3$ content, 28 mass % for the CeO$_2$ content, 25 mass % for the ZrO$_2$ content, and 3 mass % for the content of the Pr$_6$O$_{11}$ added as an additive. The cerium-to-zirconium atomic ratio (Ce/Zr) in the CZ composite oxide in this case was 0.74 (Table 3).

TABLE 3

| upper layer support | proportions of the individual components in the upper layer support (mass %) | | | | Ce/Zr (atomic ratio) |
|---|---|---|---|---|---|
| | $Al_2O_3$ | $CeO_2$ | $ZrO_2$ | $Pr_6O_{11}$ | |
| $Al_2O_3$ + CZ | 44.0 | 28.0 | 25.0 | 3.00 | 0.74 |

Rh was supported on the Al$_2$O$_3$—CZ mixture using a rhodium nitrate (Rh(NO$_3$)$_3$) solution of prescribed concentration, followed by baking for 3 hours at 500° C. in the atmosphere. The supported Rh was 0.17 mass % letting the Rh-loaded Al$_2$O$_3$—CZ mixture be 100 mass %. An upper layer slurry was prepared by mixing the obtained Rh-loaded Al$_2$O$_3$—CZ mixture, La-stabilized Al$_2$O$_3$, Al$_2$O$_3$ binder, and distilled water. The mass per unit volume of the individual components in this slurry is given in Table 2. The upper layer slurries for Examples 1 to 6 were all prepared using the production process and composition described above.

To form the layer structure of the catalyst coating layer, the lower layer slurry was washcoated on the surface of a cordierite honeycomb substrate and the excess slurry was blown off, followed by drying and baking to form the lower catalyst coating layer. Then, the upper layer slurry was washcoated and the excess slurry was blown off, followed by drying and baking to form the upper catalyst coating layer and thus yielding the exhaust gas purification catalysts according to Examples 1 to 6.

PRODUCTION EXAMPLES

Comparative Examples 1 to 3

For Comparative Example 1, a catalyst was prepared using an Al—Zr composite oxide (AZ composite oxide) made of Al$_2$O$_3$ and ZrO$_2$ for the lower catalyst coating layer (Pd catalyst layer) 34 rather than the ACZ composite oxide. The AZ composite oxide was prepared by the same production process as the previously described production process for the ACZ composite oxides of Examples 1 to 6, but in this case not including the cerium nitrate in the starting materials. Letting the AZ composite oxide be 100 mass %, the component proportions for the Al and Zr in the AZ composite oxide had been brought to 50.65 mass % for the Al$_2$O$_3$ content and 45.31 mass % for the ZrO$_2$. The cerium-to-zirconium atomic ratio (Ce/Zr) in the lower layer support in this case was of course 0 (Table 1).

For Comparative Example 2, a catalyst was prepared using a CZ composite oxide for the support for the lower catalyst coating layer (Pd catalyst layer) 34 in place of the ACZ composite oxide. This CZ composite oxide was prepared by the same process as for the previously described production process for the CZ composite oxide for the upper layer (Rh catalyst layer) support in Examples 1 to 6. Letting this CZ composite oxide be 100 mass %, the component proportions for the Ce and Zr in the CZ composite oxide had been brought to 30 mass % for the $CeO_2$ content and 60 mass % for the $ZrO_2$ content. The cerium-to-zirconium atomic ratio (Ce/Zr) in the lower layer support in this case was 0.3 (Table 1).

For Comparative Example 3, a catalyst was prepared using a CZ composite oxide+$Al_2O_3$ mixture ($Al_2O_3$—CZ mixture) for the support for the lower catalyst coating layer 34 in place of the ACZ composite oxide. This $Al_2O_3$—CZ mixture was prepared by the same process as for the previously described production process for the $Al_2O_3$—CZ mixture for the upper layer (Rh catalyst layer) support in Examples 1 to 6. Letting this $Al_2O_3$—CZ mixture be 100 mass %, the component proportions for the Al, Ce, and Zr in the $Al_2O_3$—CZ mixture had been brought to 50 mass % for the $Al_2O_3$ content, 15 mass % for the $CeO_2$ content, and 30 mass % for the $ZrO_2$ content. The cerium-to-zirconium atomic ratio (Ce/Zr) in the lower layer support in this case was 0.3 (Table 1).

Pd was supported on each of these lower layer support powders using a palladium nitrate ($Pd(NO_3)_2$) solution, followed by baking for 3 hours at 300° C. in the atmosphere to obtain the Pd-loaded lower layer support powder. The supported Pd was 0.58 mass % letting the obtained Pd-loaded lower layer support powder be 100 mass %. A lower layer slurry was prepared by mixing La-stabilized $Al_2O_3$ powder, $Al_2O_3$ binder, and distilled water into the obtained Pd-loaded lower layer support powder. The mass per unit volume of the individual components in this slurry is given in Table 2.

The upper layer slurries for Comparative Examples 1 to 3 were prepared using the same production process and component proportions as described above for the upper layer in Examples 1 to 6. The exhaust gas purification catalysts according to Comparative Examples 1 to 3 were prepared by forming the layer structure of the catalyst coating layer in Comparative Examples 1 to 3 using the same production process as described above for the layer structure in Examples 1 to 6.

(OSC Measurement Test)

The exhaust gas purification catalysts according to Examples 1 to 4 and Comparative Examples 1 to 3 were submitted to measurement of the OSC pre- and post-durability testing. The durability test was run by mounting each of the catalysts according to Examples 1 to 4 and Comparative Examples 1 to 3 in the exhaust system of a V8 engine (3UZ-FE) and holding the catalyst bed temperature at 1,000° C. for 25 hours. The OSC was measured using a thermogravimetric analyzer as follows: the sample was subjected to repeated oxidation and reduction by the alternating flow-through of hydrogen and oxygen and the weight change during this was measured to determine the OSC. The results are shown in FIG. 3.

Figure 3:
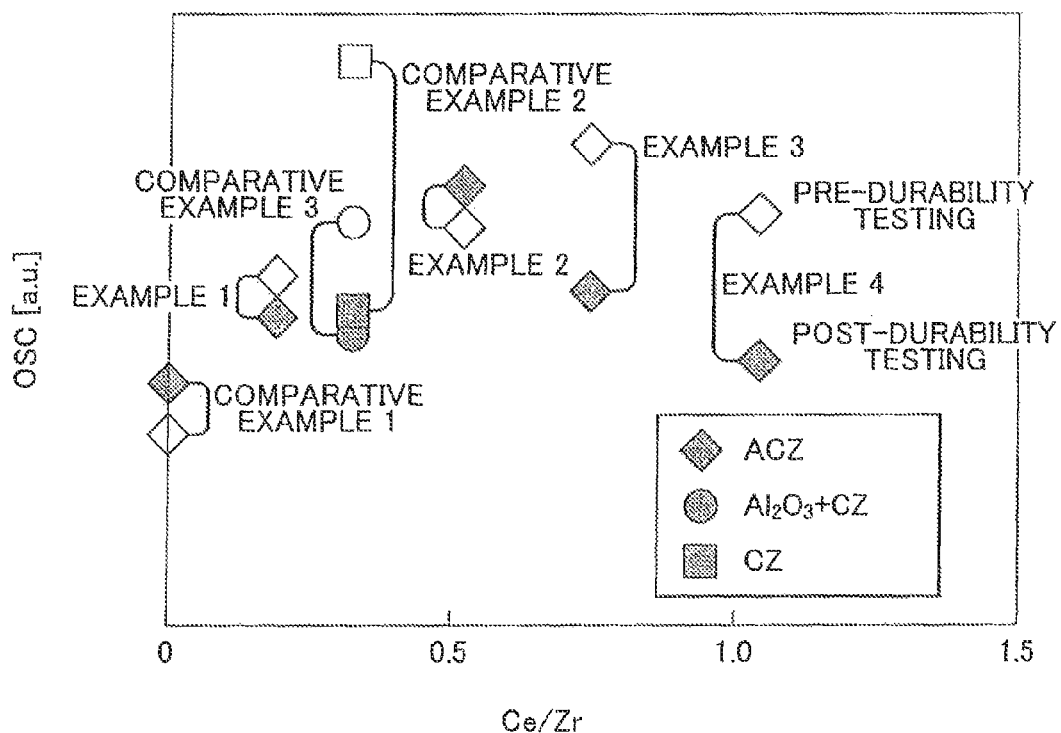
FIG. 3 is a graph that shows the relationship for an embodiment of the invention between the cerium-to-zirconium atomic ratio (Ce/Zr) in the lower layer support and the OSC of the catalyst pre- and post-durability testing.

As is clear from the results shown in FIG. 3, there is almost no change in Examples 1 and 2 in the OSC pre-versus-post durability testing. In these instances, the percentage decline in the OSC pre-versus-post durability testing (obtained by dividing the absolute value of the difference between the OSC values pre-versus-post durability testing by the OSC value pre-durability testing) was not more than 10% in Examples 1 and 2. On the other hand, in Comparative Example 2 (lower layer support: CZ composite oxide) and Comparative Example 3 (lower layer support: $Al_2O_3$—CZ mixture), the OSC post-durability testing is shown to be substantially reduced from that prior to durability testing. In particular, a large decline in the OSC occurred in Comparative Example 2, where the percentage decline in the OSC was 47%. The percentage decline in the OSC was 30% in Example 3 and 36% in Example 4. The preceding demonstrates that the decline in the OSC post-durability testing is more inhibited in the case of Examples 1 to 4, which used an ACZ composite oxide for the lower layer support, than when a CZ composite oxide was used for the lower layer support (Comparative Example 2). In addition, the decline in the OSC post-durability testing was substantially inhibited at a Ce/Zr in the ACZ composite oxide present in the lower layer support in the range of less than or equal 0.6.

(50% Purification Temperature Measurement Test)

Figure 4:
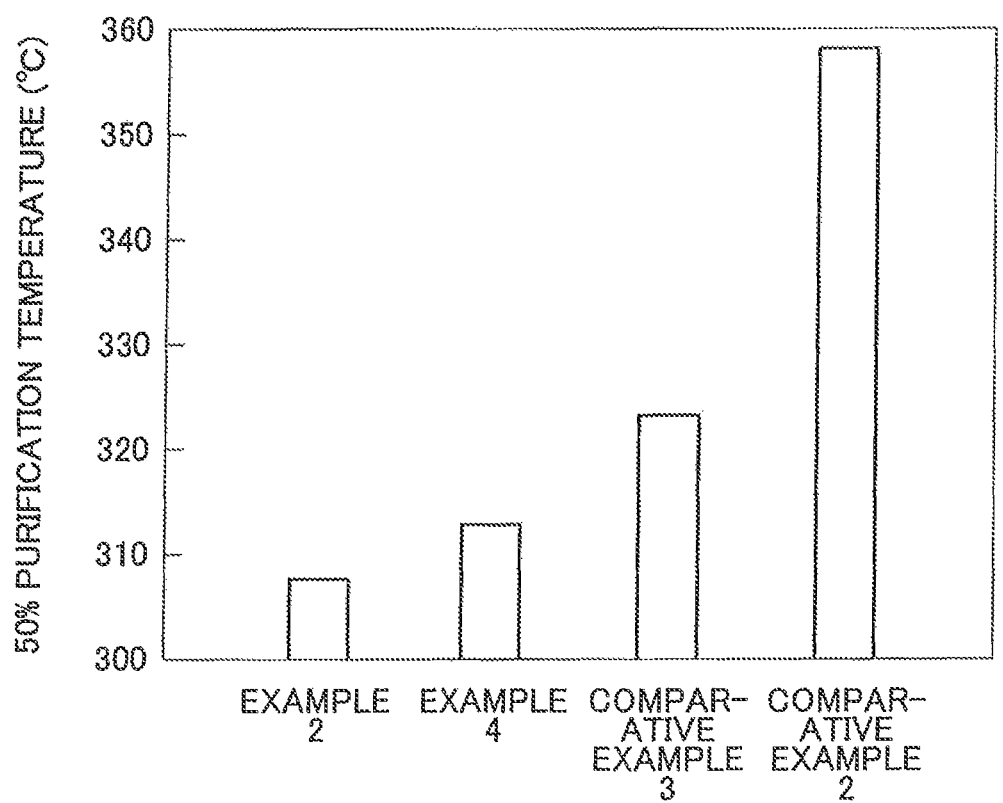
FIG. 4 is a graph that shows the 50% purification temperature after durability testing for catalysts in several comparative examples and examples according to embodiments of the invention.

Then, after durability testing, the exhaust gas purification catalysts in Examples 2 and 4 and Comparative Examples 2 and 3 (a total of 4) were each submitted to measurement of the 50% purification temperature by continuously measuring the purification rates for HC, CO, and NOx during temperature ramp up from 200 to 450° C. (rate of temperature rise=10° C./minute) in a stoichiometric atmosphere. This 50% purification temperature is the gas temperature at the catalyst inlet when the purification rates for HC, CO, and NOx reached 50%. The results are shown in FIG. 4. As is clear from the results shown in FIG. 4, Examples 2 and 4 are shown to have a lower 50% purification temperature post-durability testing than Comparative Example 2 (lower layer support: CZ composite oxide) and Comparative Example 3 (lower layer support: $Al_2O_3$—CZ mixture). Thus, the use of the ACZ composite oxide for the lower layer support was shown to improve the low-temperature catalytic activity after durability testing over that for the use of a CZ composite oxide for the lower layer support.

Figure 5:
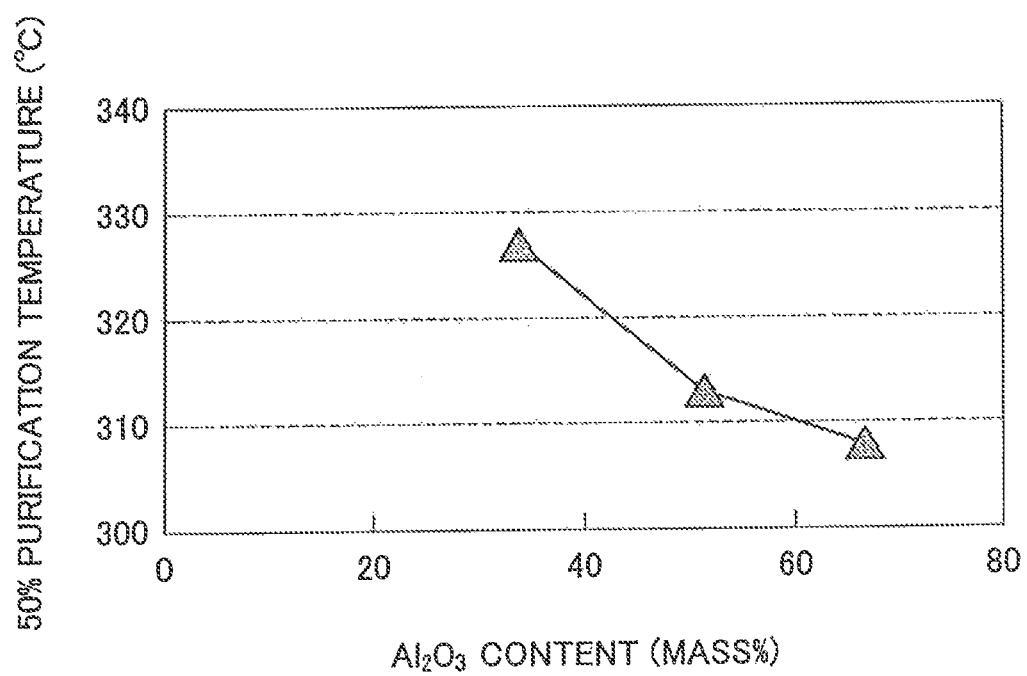
FIG. 5 is a graph that shows the relationship between the alumina content in the lower layer support and the 50% purification temperature for the catalyst post-durability testing, according to an embodiment of the invention.

The 50% purification temperature was also measured on the exhaust gas purification catalysts of Examples 4 to 6, which used ACZ composite oxide for the lower layer support and had a cerium-to-zirconium atomic ratio (Ce/Zr) in the ACZ composite oxide set to 1, but which were prepared using different $Al_2O_3$ contents. Specifically, letting the ACZ support be 100 mass %, the $Al_2O_3$ content was 33.70 mass % (Example 5), 49.79 mass % (Example 4), and 66.50 mass % (Example 6). The results are shown in FIG. 5. As is clear from the results shown in FIG. 5, the 50% purification temperature was shown to fall as the $Al_2O_3$ content in the lower layer support (ACZ support) increased and Example 6 was shown to have the lowest 50% purification temperature and thus the most enhanced low-temperature activity. In other words, when an ACZ composite oxide was used for the lower layer support, the low-temperature purification performance was excellent at an $Al_2O_3$ content in the ACZ composite oxide in the range from at least 40 mass % up to 70 mass % inclusive.

The invention claimed is:

1. An exhaust gas purification catalyst, comprising:
   a substrate;
   a catalyst coating layer that is formed of a porous support and is formed on a surface of the substrate; and
   a noble metal catalyst that is supported on the porous support of the catalyst coating layer,
   wherein:
   the catalyst coating layer is formed as a layer structure having an upper layer relatively farther from the substrate surface and a lower layer relatively closer to the substrate surface;
   Rh particles are supported as the noble metal catalyst in the upper layer;
   Pd particles are supported as the noble metal catalyst in the lower layer;

the porous support of the lower layer that supports the Pd particles is formed by an ACZ composite oxide made of alumina ($Al_2O_3$), ceria ($CeO_2$), and zirconia ($ZrO_2$);

the ACZ composite oxide is produced by an alkoxide method;

starting materials in the alkoxide method are a metal alkoxide and a metal salt;

Al, Ce, and Zr are all converted into the metal alkoxide, or at least one of Al, Ce, and Zr is converted into the metal alkoxide;

the metal salt is used for components other than the metal alkoxide;

the starting materials are dissolved in a solvent and mixed and hydrolysis and polycondensation reactions are carried out, after which the ACZ composite oxide is obtained by a heat treatment;

the ACZ composite oxide produced by the alkoxide method is a composite oxide in which the Al, Ce, and Zr become almost uniformly mixed at the atomic or oxide molecular level; and a Ce/Zr atomic ratio in the ACZ composite oxide is not more than 0.6.

2. The exhaust gas purification catalyst according to claim 1, wherein the Ce/Zr atomic ratio in the ACZ composite oxide is from at least 0.15 to not more than 0.55.

3. The exhaust gas purification catalyst according to claim 1, wherein an alumina component content in the ACZ composite oxide is from 40 to 70 mass%.

4. The exhaust gas purification catalyst according to claim 1, wherein the porous support in the lower layer further contains, in addition to the ACZ composite oxide, at least one rare earth oxide selected from $La_2O_3$, $Y_2O_3$, and $Pr_6O_{11}$.

5. The exhaust gas purification catalyst according to claim 1, wherein the porous support of the upper layer that supports the Rh particles is formed by a mixture of alumina and a CZ composite oxide made of ceria and zirconia.

6. The exhaust gas purification catalyst according to claim 5, wherein the porous support in the upper layer further contains at least one rare earth oxide selected from $La_2O_3$, $Y_2O_3$, and $Pr_6O_{11}$.

7. The exhaust gas purification catalyst according to claim 1, wherein the heat treatment in the alkoxide method is performed at from at least 500° C. to not more than 900° C.

8. An exhaust gas purification catalyst, comprising:
a substrate;
a catalyst coating layer that is formed of a porous support and is formed on a surface of the substrate; and
a noble metal catalyst that is supported on the porous support of the catalyst coating layer,
wherein:
the catalyst coating layer is formed as a layer structure having an upper layer relatively farther from the substrate surface and a lower layer relatively closer to the substrate surface;
Rh particles are supported as the noble metal catalyst in the upper layer;
Pd particles are supported as the noble metal catalyst in the lower layer;
the porous support of the lower layer that supports the Pd particles is formed by an ACZ composite oxide made of alumina ($Al_2O_3$), ceria ($CeO_2$), and zirconia ($ZrO_2$);
the ACZ composite oxide is produced by an alkoxide method;
starting materials in the alkoxide method are a metal alkoxide and a metal salt;
Al, Ce, and Zr are all converted into the metal alkoxide, or at least one of Al, Ce, and Zr is converted into the metal alkoxide;
the metal salt is used for components other than the metal alkoxide;
the starting materials are dissolved in a solvent and mixed and hydrolysis and polycondensation reactions are carried out, after which the ACZ composite oxide is obtained by a heat treatment;
the ACZ composite oxide produced by the alkoxide method is a composite oxide in which the Al, Ce, and Zr become almost uniformly mixed at the atomic or oxide molecular level; and
primary particles in the ACZ composite oxide have an average particle diameter of not more than 10 nm and a specific surface area of at least 30 $m^2/g$.

9. An exhaust gas purification catalyst, comprising:
a substrate;
a catalyst coating layer that is formed of a porous support and is formed on a surface of the substrate; and
a noble metal catalyst that is supported on the porous support of the catalyst coating layer,
wherein:
the catalyst coating layer is formed as a layer structure having an upper layer relatively farther from the substrate surface and a lower layer relatively closer to the substrate surface;
Rh particles are supported as the noble metal catalyst in the upper layer;
Pd particles are supported as the noble metal catalyst in the lower layer;
the porous support of the lower layer that supports the Pd particles is formed by an ACZ composite oxide made of alumina ($Al_2O_3$), ceria ($CeO_2$), and zirconia ($ZrO_2$);
the ACZ composite oxide is produced by an alkoxide method;
starting materials in the alkoxide method are a metal alkoxide and a metal salt;
Al, Ce, and Zr are all converted into the metal alkoxide, or at least one of Al, Ce, and Zr is converted into the metal alkoxide;
the metal salt is used for components other than the metal alkoxide;
the starting materials are dissolved in a solvent and mixed and hydrolysis and polycondensation reactions are carried out, after which the ACZ composite oxide is obtained by a heat treatment;
the ACZ composite oxide produced by the alkoxide method is a composite oxide in which the Al, Ce, and Zr become almost uniformly mixed at the atomic or oxide molecular level;
the porous support of the upper layer that supports the Rh particles is formed by a mixture of alumina and a CZ composite oxide made of ceria and zirconia; and
a Ce/Zr atomic ratio in the CZ composite oxide is at least 0.5.

10. The exhaust gas purification catalyst according to claim 9, wherein the Ce/Zr atomic ratio in the CZ composite oxide is from at least 0.7 to not more than 0.8.

\* \* \* \* \*